(12) United States Patent
Sato

(10) Patent No.: US 8,266,146 B2
(45) Date of Patent: Sep. 11, 2012

(54) INFORMATION PROCESSING APPARATUS, INFORMATION PROCESSING METHOD AND MEDIUM STORING PROGRAM THEREOF

(75) Inventor: Yukimasa Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 12/476,942

(22) Filed: Jun. 2, 2009

(65) Prior Publication Data

US 2009/0327246 A1 Dec. 31, 2009

(30) Foreign Application Priority Data

Jun. 25, 2008 (JP) ................................. 2008-166543

(51) Int. Cl.
 *G06F 17/30* (2006.01)
(52) U.S. Cl. ........................................................ 707/736
(58) Field of Classification Search .................. None
 See application file for complete search history.

(56) References Cited

U.S. PATENT DOCUMENTS

| | | | | |
|---|---|---|---|---|
| 5,414,809 A | * | 5/1995 | Hogan et al. ................. | 715/765 |
| 6,421,685 B1 | * | 7/2002 | Nishikawa ............................. | 1/1 |
| 7,523,452 B1 | * | 4/2009 | Kamity et al. ................. | 717/178 |
| 2002/0040360 A1 | * | 4/2002 | Sohma et al. ...................... | 707/3 |
| 2005/0278379 A1 | * | 12/2005 | Nakazawa ................. | 707/104.1 |
| 2006/0007481 A1 | | 1/2006 | Kato et al. | |
| 2006/0010115 A1 | | 1/2006 | Yoshida et al. | |
| 2006/0085442 A1 | | 4/2006 | Fujiwara | |
| 2006/0153537 A1 | * | 7/2006 | Kaneko et al. .................. | 386/95 |
| 2009/0228508 A1 | * | 9/2009 | Date et al. ...................... | 707/102 |
| 2009/0248954 A1 | * | 10/2009 | Hiraiwa et al. ............... | 711/100 |
| 2010/0325158 A1 | * | 12/2010 | Oral et al. ..................... | 707/780 |

FOREIGN PATENT DOCUMENTS

| | | |
|---|---|---|
| CN | 1719864 A | 1/2006 |
| CN | 1763747 A | 4/2006 |
| JP | 2000339211 A | 12/2000 |
| JP | 2005352782 A | 12/2005 |
| JP | 2006023942 A | 1/2006 |

OTHER PUBLICATIONS

Chinese Office Action dated Jul. 22, 2011 in corresponding Chinese Application No. 200910148664.1, and English language translation thereof.

* cited by examiner

*Primary Examiner* — Bai D. Vu
(74) *Attorney, Agent, or Firm* — Fitzpatrick, Cella, Harper & Scinto

(57) ABSTRACT

Metadata to be appended to an object in a document is generated. When the user edits the generated metadata, another document including the same object as the object to which the metadata is appended is searched for, and the contents edited by the user are reflected to metadata appended to the object in another searched document.

13 Claims, 18 Drawing Sheets

FIG. 13A

| ✓ | TYPE | DOCUMENT NAME | PAPER SIZE | PAGE | Date |
|---|------|---------------|------------|------|------|
|   | PDF  | AAA           | A4         | 128  | 2006/12/03 |
| ✓ | PDF  | XXX           | A4         | 128  | 2006/12/03 |
|   | JPEG | BBB           | A4         | 128  | 2006/12/03 |
| ✓ | PDF  | PICTURE IMAGE ANALYSIS | A4 | 128 | 2006/12/03 |
|   | PDF  | DDD           | A4         | 128  | 2006/12/03 |

TOUCH PEN

[CANCEL] [SELECT]

FIG. 13B

PDF

Word

TEXT

JPEG

EXCEL

ALL

INFORMATION PROCESSING APPARATUS, INFORMATION PROCESSING METHOD AND MEDIUM STORING PROGRAM THEREOF

BACKGROUND OF THE INVENTION

1. Field of the Invention

The present invention relates to an information processing apparatus, information processing method for processing a document and a medium storing a program thereof.

2. Description of the Related Art

An image processing apparatus which stores print data, and prints print data in response to a user's operation as needed is prevalently used. In such an image processing apparatus, a technique for converting print data into an internal document format and executing pre-print processing upon storing the print data is known. When an image input from an image input apparatus is saved as a file in a secondary storage device in an image output apparatus by the aforementioned technique, the user can read out and repetitively output that image at desired timings. Such function of storing input data in the secondary storage device of the image output apparatus in a file format for the purpose of re-use is called a box function and, in particular, a file system is called a box.

Japanese Patent Laid-Open No. 2006-23942 describes a technique which converts a bitmap image input by an image input apparatus into drawing data which does not depend on the resolution of the image input apparatus. Such processing for converting a bitmap image into resolution-independent data is called vector conversion or vectorization, and data obtained as a result of vectorization is called vector data.

A file in a box in the box function is a bitmap image or vector data. As the number of saved files increases, it is harder to find out a target file from list information of file names or thumbnails. In such case, the user inputs a keyword included in the target file from a user interface, and displays a list of only files that match the keyword using a search function, thus improving the user's convenience.

Japanese Patent Laid-Open No. 2005-352782 describes a technique which diverts a keyword of similar image data which is similar to target image data to that of the target image data, and reduces the load on keyword assignment. However, since vector data generated by vectorization is drawing data used to execute resolution-independent drawing, it does not always include a search keyword to be used by the user such as character string information and image information in a document.

Therefore, to solve this problem, subsidiary information obtained upon generation of resolution-independent data is generated as non-printed additional information, and is appended to vector data. Such additional information is often also called metadata. Normally, the generated metadata is appended to an aggregate of jobs, pages, and drawing objects (for example, an aggregate including drawing units such as Text, Graphic, and Image objects together).

Upon storing a document stored in an image processing apparatus in an intermediate data format, the user may often edit additional information. Assuming that an object corresponding to the edited additional information is used in a plurality of documents, the contents of the additional information may be biased depending on documents. The contents of generated additional information may often be difference for respective apparatuses due to different additional information generation methods. For example, a generation method having a newer function may generate a larger number of pieces of additional information than a conventional generation method. Additional information is normally used upon searching for documents using keywords, and it is desired that additional information is not biased among documents that commonly use an object appended with the additional information.

As described in Japanese Patent Laid-Open No. 2000-339211, for example, a system in which files are stored in a server or the like and are shared in an arrangement in which a plurality of apparatuses are linked via a network or the like is prevalently used. In such an arrangement, the contents of additional information may be biased by a user's edit operation among files stored in the server or the like.

SUMMARY OF THE INVENTION

The present invention provides an information processing apparatus which can prevent the contents of additional information data to be appended to identical objects from being biased in respective documents irrespective of whether or not the additional information data is edited.

The present invention in its first aspect provides an information processing apparatus comprising: a generation unit configured to generate metadata to be appended to an object in a document; a search unit configured to search for, when a user edits the metadata generated by the generation unit, another document including the same object as the object to which that metadata is appended; and a reflection unit configured to reflect the contents edited by the user to metadata appended to the same object in another document found by the search unit.

The present invention in its second aspect provides an information processing method comprising: a generation step of generating metadata to be appended to an object in a document; a search step of searching for, when a user edits the metadata generated in the generation step, another document including the same object as the object to which that metadata is appended; and a reflection step of reflecting the contents edited by the user to metadata appended to the same object in another document found in the search step.

The present invention in its third aspect provides a computer-readable medium storing a program for making a computer function to: generate metadata to be appended to an object in a document; search for, when a user edits the generated metadata, another document including the same object as the object to which that metadata is appended; and reflect the contents edited by the user to metadata appended to the same object in another document.

The present invention in its fourth aspect provides an information processing apparatus comprising: a reception unit configured to receive a document including metadata and information indicating a first generation unit used to generate the metadata from an apparatus connected via a network; a second generation unit configured to generate metadata to be appended to an object in the document received by the reception unit; a determination unit configured to determine whether or not the second generation unit is different from the first generation unit; and a complement unit configured to compare, when the determination unit determines that the first generation unit is different from the second generation unit, the metadata generated by the first generation unit with the metadata generated by the second generation unit, and complement the metadata each other.

According to the present invention, the contents of additional information data to be appended to identical objects can be prevented from being biased irrespective of whether or not the additional information data is edited.

Further features of the present invention will become apparent from the following description of exemplary embodiments with reference to the attached drawings.

BRIEF DESCRIPTION OF THE DRAWINGS

FIGS. 13A and 13B are views showing an example of a metadata editing user interface according to the embodiment;

DESCRIPTION OF THE EMBODIMENTS

Figure 1:
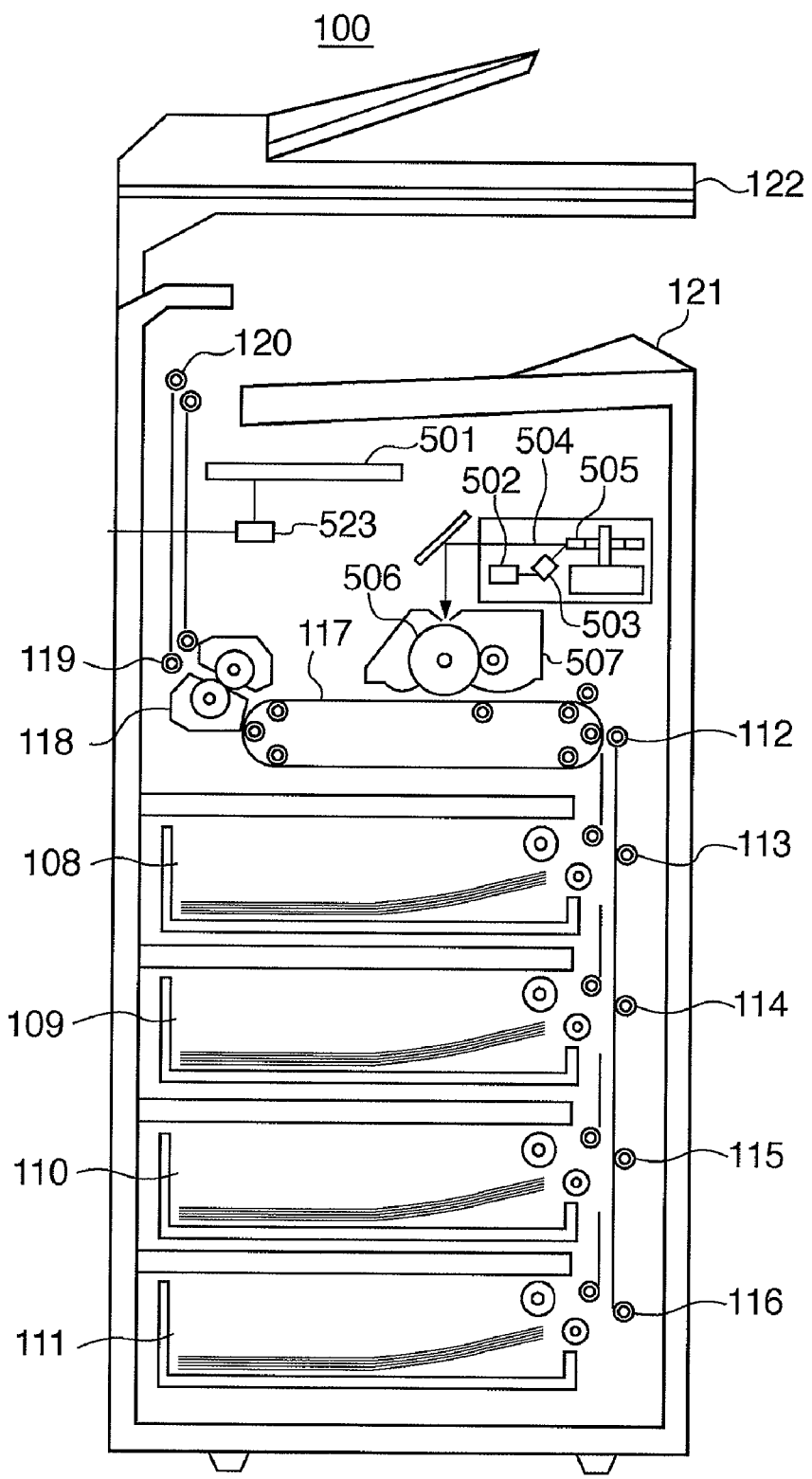
FIG. 1 is a view showing the overall arrangement of an image forming apparatus according to an embodiment of the present invention.

The best mode for carrying out the present invention will be described in detail hereinafter with reference to the drawings. Note that the same reference numerals denote the same components, and a repetitive description thereof will be avoided.

<First Embodiment>

An embodiment when an information processing apparatus to which the present invention is applied is embodied by an image forming apparatus will be explained. FIG. 1 is a sectional view showing the internal structure of a Multi Function Peripheral (to be abbreviated as an MFP hereinafter) as an image forming apparatus, which has a printer function, copy function, and facsimile function.

Referring to FIG. 1, an MFP 100 is used as a network printer which receives print data via a network, and prints the print data. The MFP 100 is also connected to a telephone line, and can be used as a facsimile apparatus or can be used as a copying machine by itself. An operation panel 121 includes switches required for operations and a liquid crystal touch panel which displays the status of the MFP 100 and the like. A control unit 501 controls the MFP 100. A laser driver 502 is a circuit for driving a semiconductor laser oscillator 503, and turns on or off a laser beam 504 to be emitted by the semiconductor laser oscillator 503 in accordance with an input video signal. The laser beam 504 is deflected to the right and left directions by a rotary polygonal mirror 505 to scan the surface of an electrostatic drum 506, thereby forming an electrostatic image on the electrostatic drum 506. This electrostatic image is developed by a developing unit (toner cartridge) 507 arranged around the electrostatic drum 506, and is then transferred onto a print sheet.

As this print sheet, cut sheets are used. The cut sheets are stored in paper cassettes 108, 109, 110, and 111 attached to the MFP 100, and are picked up and fed into the apparatus by paper feed rollers 113, 114, 115, and 116. The picked-up cut sheet is fed onto a paper convey belt 117 by paper convey rollers 112, and passes through an image forming and developing mechanism. Toner (powder ink) transferred onto the print sheet is fixed on the print sheet by a heat and pressure by a fixing device 118. The print sheet on which the toner is fixed is discharged outside the MFP 100 by convey rollers 119 and 120. When the user sets a document and inputs a copy instruction from the operation panel 121, a scanner 122 captures a reflected image of the document which is fed onto a platen and is exposed by a halogen lamp (not shown). The captured image is A/D-converted into a digital image, which is sent to the control unit 501. The digital image undergoes required processing to be converted into a video signal, which is input to the laser driver 502. When print data is received via an external network, it is analyzed by the control unit 501 and is converted into a video signal, which is input to the laser driver 502. When facsimile data is received via the telephone line, it is fetched by the control unit 501 via a modem 523, and is converted into a video signal, which is input to the laser driver 502.

Figure 2:
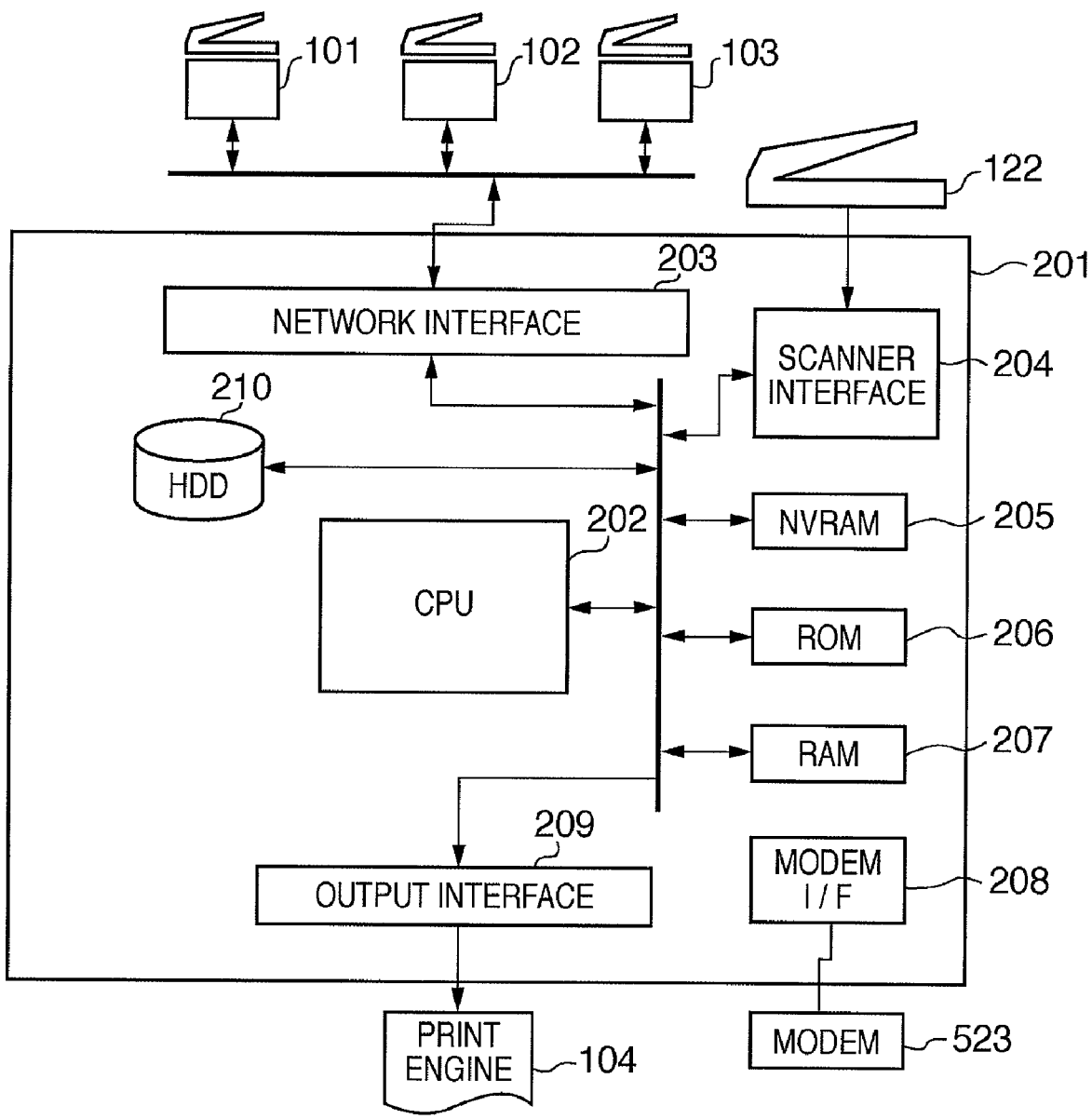
FIG. 2 is a block diagram showing the arrangement of a control unit of an MFP shown in FIG. 1.

FIG. 2 is a schematic block diagram showing the arrangement of the control unit 501 of the MFP 100 shown in FIG. 1. FIG. 2 shows a main body of a controller board 201. MFPs 101, 102, and 103 are connected to each other via a network. In this embodiment, a plurality of MFPs is connected, and executes remote copy processing among them. A network interface 203 makes network communications. PDL data is exchanged via the network interface 203. The network interface 203 can make encrypted communications with other MFPs. The operation panel 121 shown in FIG. 1 is an operation interface used to control the MFP, and can be used to operate other MFPs via the network interface 203. When the user gives the instruction to execute copy processing from the operation panel 121, the control unit 501 applies image processing to a video signal sent from the scanner 122 via a scanner interface 204 in the copy processing. The video signal that has undergone the image processing is sent to a print engine 104 via an output interface 209, and then undergoes the copy processing.

The image processing to be applied includes, for example, conversion from the scan resolution of the scanner 122 into the print resolution of the print engine 104, and rotation processing in correspondence with the paper convey direction of the print engine 104. In the remote copy processing of this embodiment, an incoming video signal is vectorized in correspondence with information of a print destination, and is converted into PDL data, thus attaining the image processing. The generated PDL data is transmitted to another MFP designated by the user via the network interface 203. Conversely, the user may operate the MFP 101 to transfer an image scanned by the scanner of the MFP 101 to the MFP 100 and to control the MFP 100 to print that image.

A hard disk 210 stores copy images to be accumulated and watermark data, and image data and print data registered by a BOX function. Upon reception of facsimile data from the modem 523 connected to the telephone line via a modem interface 208, that data is processed by a CPU 202, and is converted into dot data. The generated dot data is sent to the print engine 104 via the output interface 209, and is actually printed. The processing executed in this case includes, for example, decompression of Huffman-compressed print data.

The processing sequence of a series of these processes by the CPU 202 are all programmed in a ROM 206, and the CPU 202 operates according to that program.

In this embodiment, the converted image is stored in a RAM 207. The accumulated images are sent to the print engine 104 via the output interface 209, and are actually printed. Data coming from the scanner 122 and modem 523 are accumulated on the RAM 207, and undergo required processing. A nonvolatile memory 205 (to be also referred to as an NVRAM (Non Volatile RAM) hereinafter) which includes a general EEPROM stores panel setting values designated on the operation panel 121.

Figure 3:
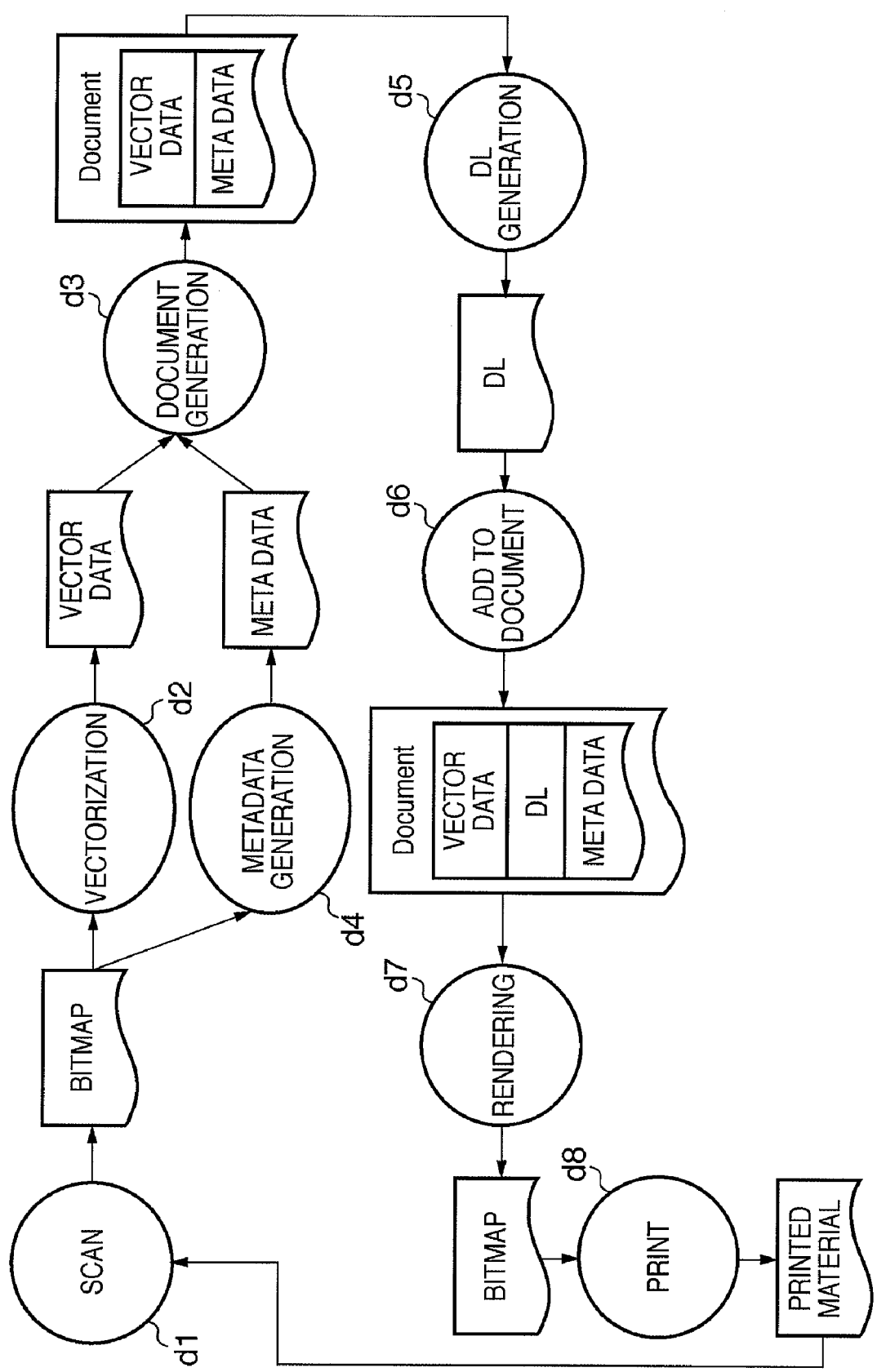
FIG. 3 is a view showing the data sequence of scan/copy processing.

FIG. 3 shows the data sequence in the copy operation. The processes shown in FIGS. 3 to 5 to be described below are implemented by, for example, the CPU 202. A paper document set on a document exposure unit is converted into bitmap data by a scan processor (d1). Next, a vectorization processor (d2) and metadata generation processor (d4) respectively generate, from the bitmap data, resolution-independent vector data and metadata as additional information to be appended to that vector data. Practical generation methods of the vector data and metadata will be described later.

Then, a document generation processor (d3) generates a document that associates the vector data and metadata with each other. A DL generation processor (d5) generates a display list (DL) from the vector data in the document. The generated DL is stored in the document (d6), and is sent to a rendering processor (d7) to be rendered to a bitmap. The rendered bitmap is printed on a paper medium by a print processor (d8), thus obtaining a printed material. When the output printed material is set on the document exposure unit again, the processing from the scan processor (d1) can be restarted.

Figure 4:
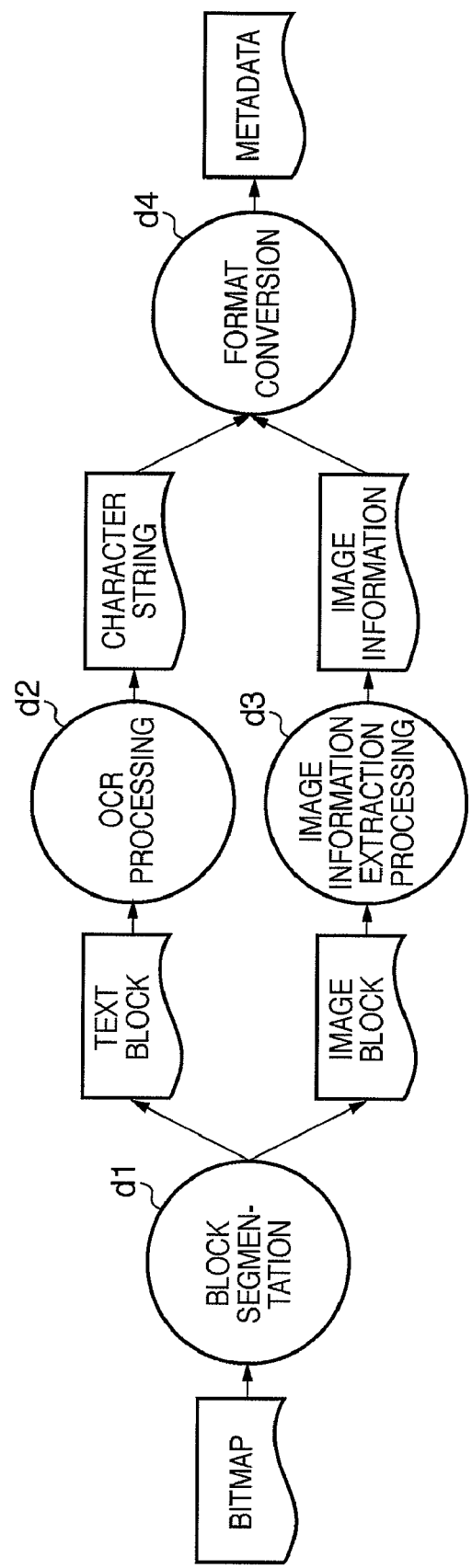
FIG. 4 is a view showing the data sequence of metadata generation processing.

FIG. 4 shows the practical data sequence of the metadata generation processor (d4) shown in FIG. 3. A block segmentation processor (d1) executes block segmentation from a bitmap. The block segmentation is processing for analyzing input bitmap image data, segmenting the image data into blocks for respective groups of objects included in the image, and determining attributes of the blocks to classify the blocks. The attributes include types such as text (TEXT), image (PHOTO), line (LINE), graphics (PICTURE), and table (TABLE).

Figure 6:
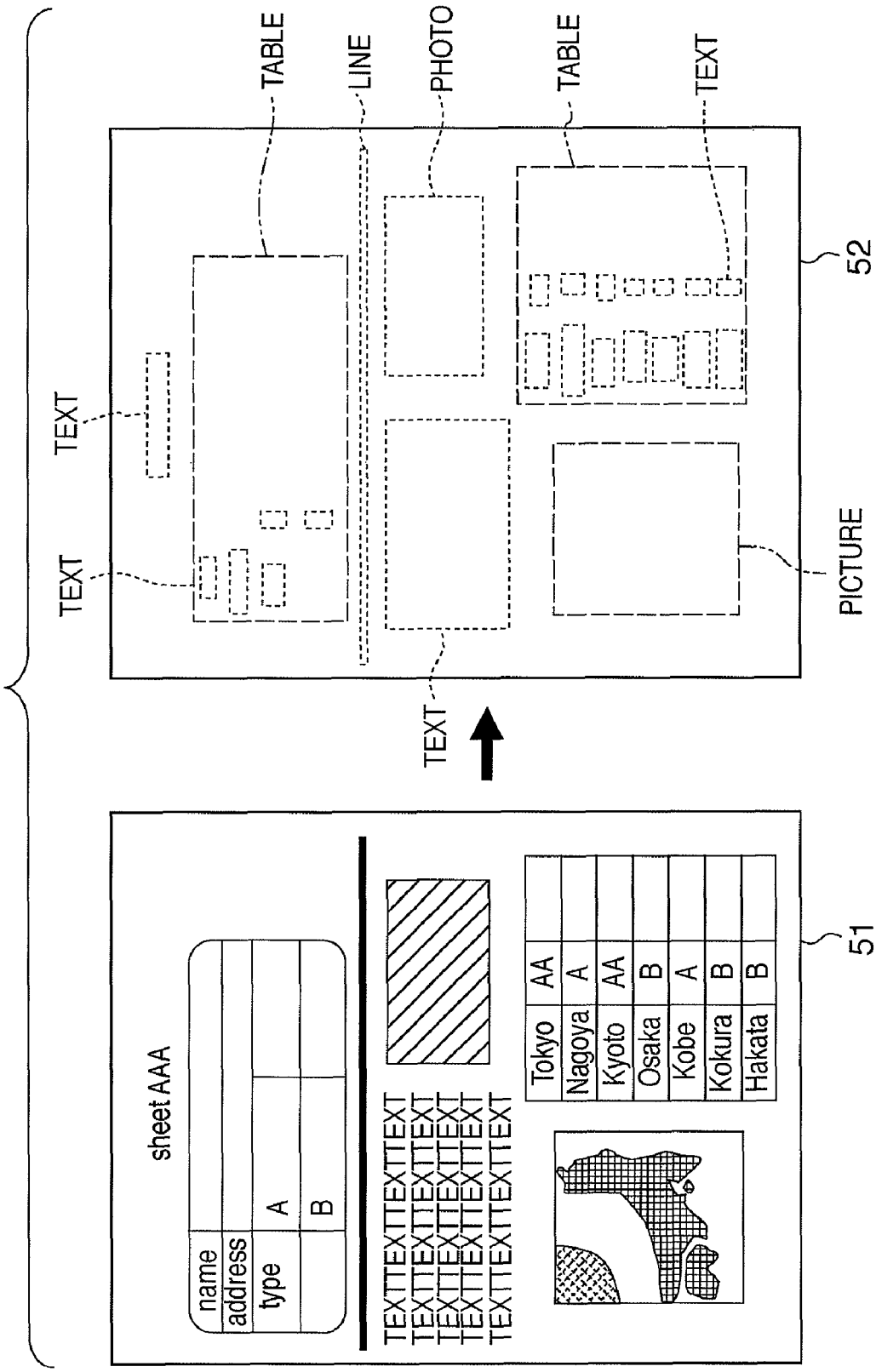
FIG. 6 is a view showing an example of block segmentation in vectorization processing.

FIG. 6 shows an example of the block segmentation result of an input image. A determination result image 52 is a result of block segmentation applied to an input image 51. In the determination result image 52, a part bounded by the dotted line represents one unit of an object as the analysis result of the image, and the types of attributes given to respective objects are determination results of the block segmentation. Blocks with the text attribute of those which are classified for respective attributes undergo character recognition processing by an OCR processor (d2), and are converted into character strings. That is, these character strings are those printed on a sheet surface. On the other hand, blocks with the image attribute of those which are classified for respective attribute are converted into image information via an image information extraction processor (d3). The image information is a character string which represents a feature of an image, that is, a character string "flower" or "face". Extraction of image information can use a general image processing technique such as image feature amount (the frequencies and densities of pixels that form an image) detection and face recognition.

The generated character strings and image information are arranged to have a data format to be described later by a format conversion processor (d4), thus generating metadata.

Figure 5:
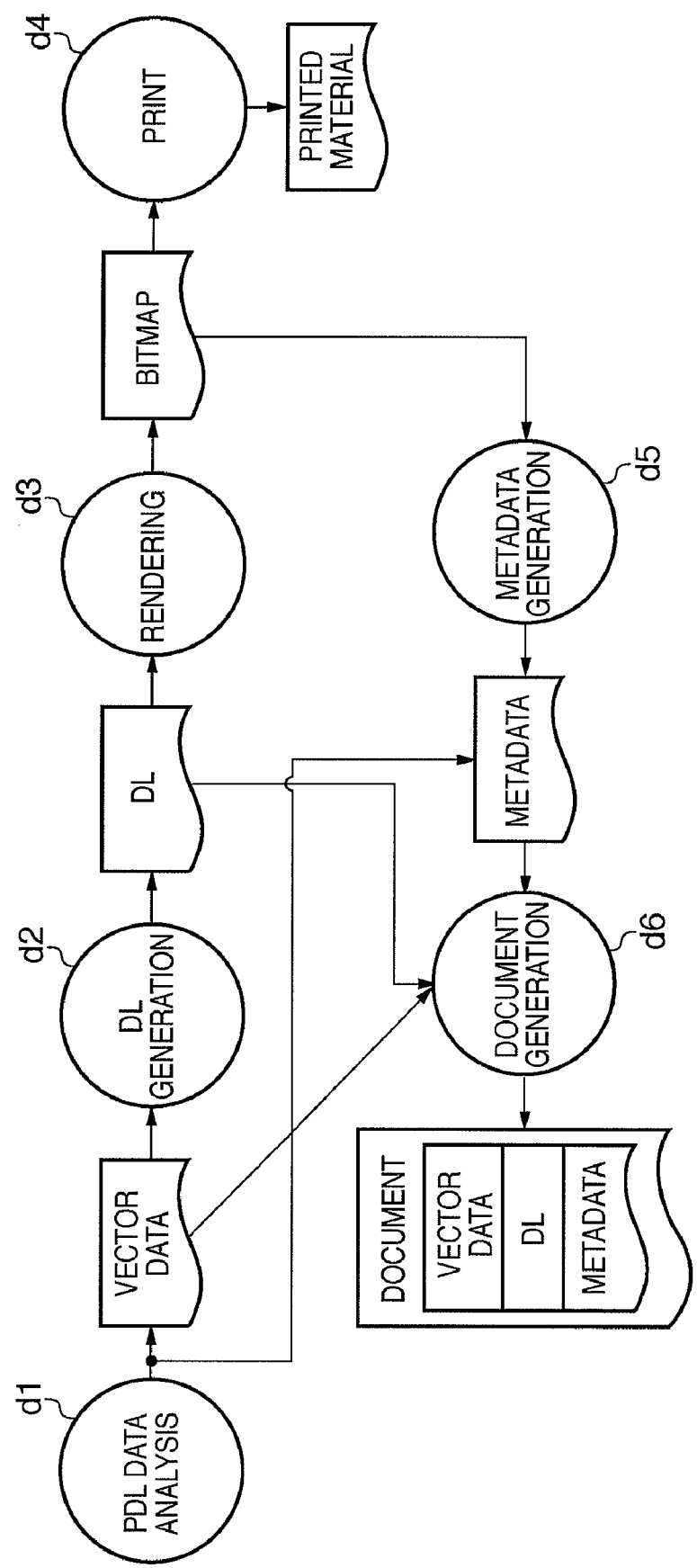
FIG. 5 is a view showing the data sequence of PDL print processing.

FIG. 5 shows the data sequence in PDL (Page Description Language) print processing. The PDL print processing means a printer operation which receives page description language (PDL) data generated by a printer driver on a PC and prints when the user inputs a print instruction from application software on the PC. The received PDL data is analyzed by a PDL data analysis processor (d1) to generate vector data. Then, a DL generation processor (d2) generates a DL from the vector data. The generated DL is stored in a document, and is sent to a rendering processor (d3) to be rendered to a bitmap. The rendered bitmap is printed on a paper medium by a print processor (d4), thus obtaining a printed material.

The vector data and DL generated during this process are stored in a document by a document generation processor (d6). Furthermore, a metadata generation processor (d5) described in FIG. 4 generates character strings and image information as metadata from the bitmap generated by the rendering processor (d3) as in the copy operation, and the metadata is stored in the document. Various kinds of PDL such as LIPS (LBP Image Processing System) and PS (PostScript) are available, and some kinds of PDL have character string information. In this case, metadata is generated from character strings at the time of PDL analysis, and is stored in a document.

Figure 7:
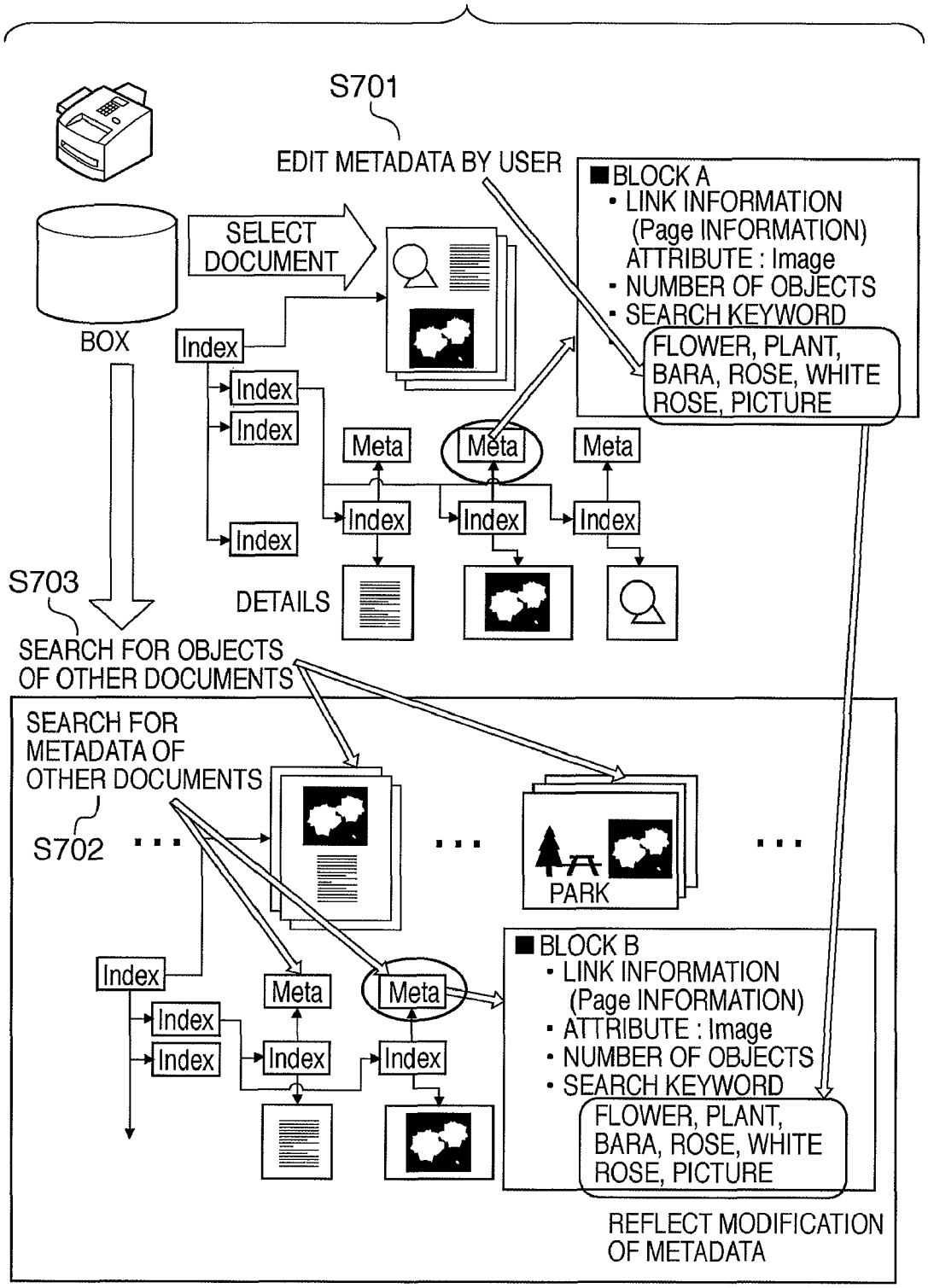
FIG. 7 is a view showing an overview of reflection processing of edited information of metadata according to the first embodiment.

FIG. 7 is a view showing an overview of processing at the time of editing of metadata in this embodiment. When the user edits metadata in a document stored in a BOX in an MFP shown in FIG. 7 (S701), identical metadata are searched for from those of documents stored in the BOX (S702). Next, metadata for an identical object are searched for from the found identical metadata (S703). Then, the contents edited by the user are reflected to the found metadata for an identical object (e.g., for an identical image attribute).

Figure 8:
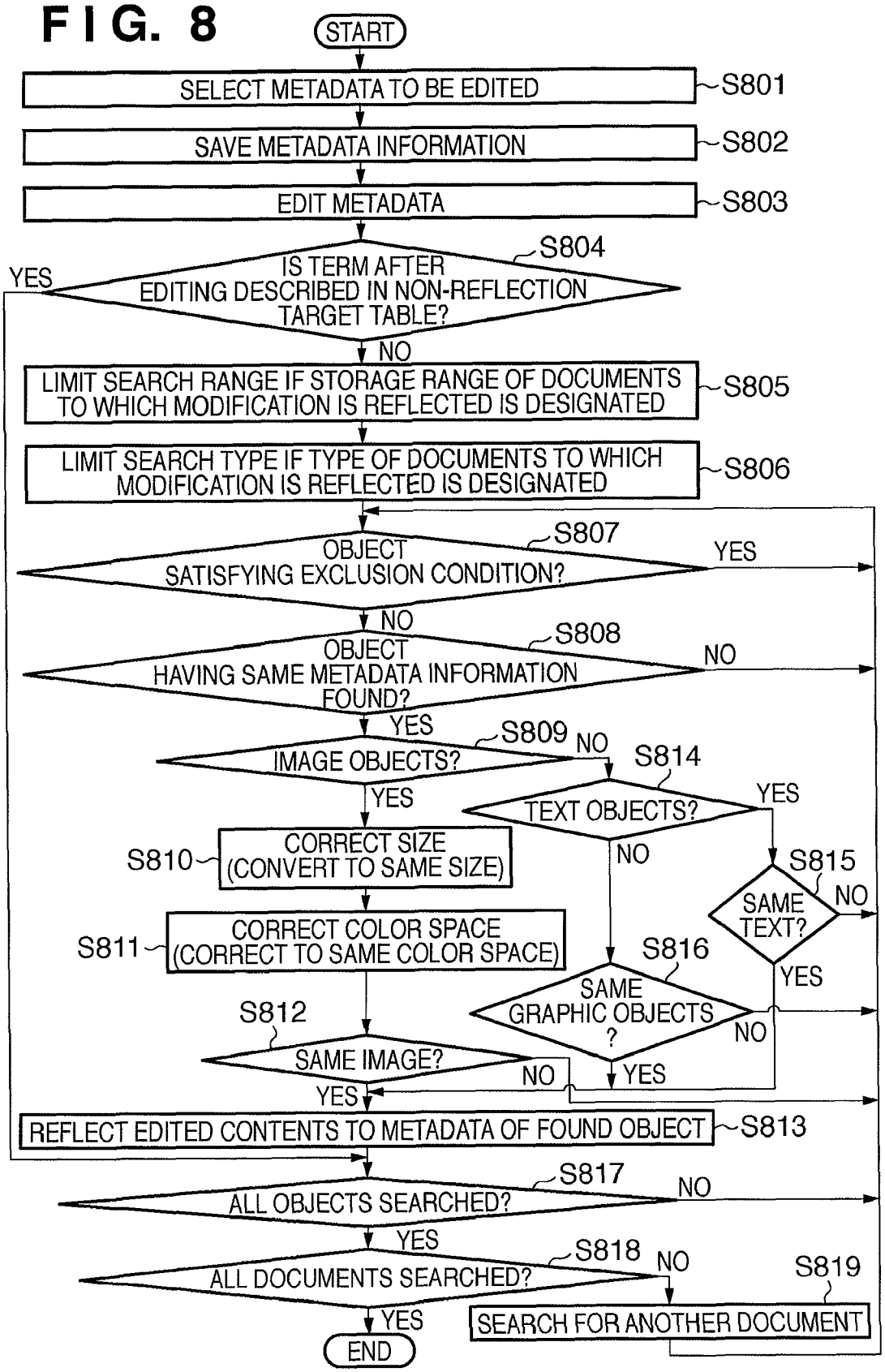
FIG. 8 is a flowchart showing the sequence of the reflection processing of edited information upon editing metadata according to the embodiment.

FIG. 8 is a flowchart for explaining the operation of the image processing apparatus of this embodiment. FIG. 8 explains the operation of the controller board 201 in reflection processing of edited information upon editing of metadata shown in FIG. 7. The processing of the flowchart shown in FIG. 8 is executed by, for example, the CPU 202.

If the user selects metadata to be edited in step S801, the metadata before editing is saved in a storage area of the RAM or the like in step S802, and the user edits that metadata in step S803.

It is determined in step S804 whether or not an edited keyword (term) is registered in a list table of terms which are not reflected to other metadata. If it is determined that the edited keyword is registered in the list table, the reflection processing is skipped, thus ending this processing. On the other hand, if it is determined that the edited keyword is not registered in the list table, the process advances to step S805.

In the process of step S804, if the added keyword is the same as a term which is registered in advance, it is excluded from targets to be reflected to other objects. In the list table of terms which are not reflected to metadata, terms such as "table", "figure", and "example", which are frequently used in normal documents, are registered. If documents are searched using, as keywords, the terms which are frequently used in normal documents, most of documents are selected, and these terms are inappropriate as keywords for selection. Therefore, when these keywords are stored in metadata, a wasteful keyword search is included, thus lowering the search efficiency. For this reason, in this embodiment, keywords included in the list table of terms which are not reflected are not reflected to other metadata. Such term list may be stored in a storage area of the ROM or the like.

When the user designates a range of documents to which the edited contents are to be reflected, a search range in the subsequent steps is limited according to that designation in step S805. Note that the process of step S805 follows a predetermined storage range such as a user's designation. The range of documents can be designated on a selection screen shown in 12B of FIG. 12, which transits from a user interface (UI) shown in 12A of FIG. 12 by selecting a "select edited document valid range" button using a touch pen or the like. In this embodiment, the user can designate ranges "only designated documents", "identical user's documents", "documents stored in MFP", "identical user's documents in network", and "documents in network". When the user designates the range on this UI, the storage range of documents is limited in step S805.

When the user designates the type of documents in addition to the storage range of documents designated in step S805, a range of the type of documents to be searched is limited in step S806.

The process of step S806 is executed to conduct a search only for documents of a predetermined type which is designated by, for example, the user. The user can designate the document type in step S806 on a UI shown in FIG. 13B by selecting "designate document type" in 12B of FIG. 12. In this embodiment, the user can select the type from "PDF", "Word", "TEXT", "JPEG", and "EXCEL". If the user selects "ALL", all files are selected as search targets. In this embodiment, when the user designates the type on the UI in FIG. 13B, documents with the designated type may be marked and displayed, as shown in FIG. 13A.

Documents including objects having metadata before editing are searched from the range specified as described above, and the edited contents are reflected to these objects.

It is determined in step S807 whether or not an object of interest in a document of interest is an object which satisfies a predetermined condition. If it is determined that the object of interest is an object which satisfies the predetermined condition, the reflection processing of the user's edited contents is skipped, and the processes are repeated from step S807 for other objects in the document of interest. On the other hand, if it is determined that the object of interest is not an object which satisfies the predetermined condition, the process advances to step S808. The process of step S807 will be described later with reference to FIG. 9.

It is determined in step S808 whether or not the object of interest has the same metadata as that before editing. If it is determined that the object of interest does not have the same metadata, the reflection processing of the user's edited contents is skipped, and the processes are repeated from step S807 for other objects in the document of interest. On the other hand, if it is determined that the object of interest has the same metadata, the process advances to step S809.

It is determined in step S809 whether or not both the object of the edited metadata and the object of interest are image objects. If it is determined that both the objects are image objects, the process advances to step S810; otherwise, the process advances to step S814.

In step S810, one of the object of interest and the object having the metadata before editing is enlarged or reduced in size to adjust the image sizes. That is, the image objects are normalized to the same size to allow comparison of images. In step S811, the color spaces of the objects are converted into the same space. That is, the color spaces of the objects are normalized to allow comparison of images. It is determined in step S812 if the object of interest and the object having the metadata before editing are identical image objects. If it is determined that these objects are not identical image objects, the reflection processing of the user's edited contents is skipped, and the processes are repeated from step S807 for other documents. On the other hand, if it is determined that these objects are identical image objects, the process advances to step S813, and the user's edited contents are reflected to the metadata of the object of interest. In this embodiment, whether or not objects are identical image objects is determined by adjusting the sizes and color spaces in steps S810 to S812.

Referring back to step S809, when the process advances to step S814, it is determined in step S814 whether or not these objects are text objects. If it is determined that these objects are text objects, the process advances to step S815; otherwise, the process advances to step S816. It is determined in step S815 whether or not the object of interest and the object having the metadata before editing are identical text objects. In this embodiment, for example, when the objects include only different fonts like Ming and Gothic fonts, it is determined that they are identical text objects. If it is determined that these objects are not identical text objects, the reflection processing of the user's edited contents is skipped, and the processes are repeated from step S807. On the other hand, if it is determined that these objects are identical text objects, the process advances to step S813, and the user's edited contents are reflected to the metadata of the object of interest.

Referring back to step S814, when the process advances to step S816, it is determined in step S816 whether or not the objects are identical graphic objects. If it is determined that the objects are not identical graphic objects, the reflection processing of the user's edited contents are skipped, and the processes are repeated from step S807 for other objects in the document of interest. On the other hand, if it is determined that the objects are identical graphic objects, the process advances to step S813, and the user's edited contents are reflected to the metadata of the object of interest.

It is determined in step S817 if all objects are searched in the document of interest. If it is determined that all objects have been searched, the process advances to step S818; otherwise, the processes are repeated from step S807. It is determined in step S818 whether or not all documents are searched. If it is determined that all documents are searched, this processing ends. On the other hand, it is determined in step S819 that not all documents are searched, another document is selected and is set as a new document of interest, thus repeating the processes from step S807.

Figure 9:
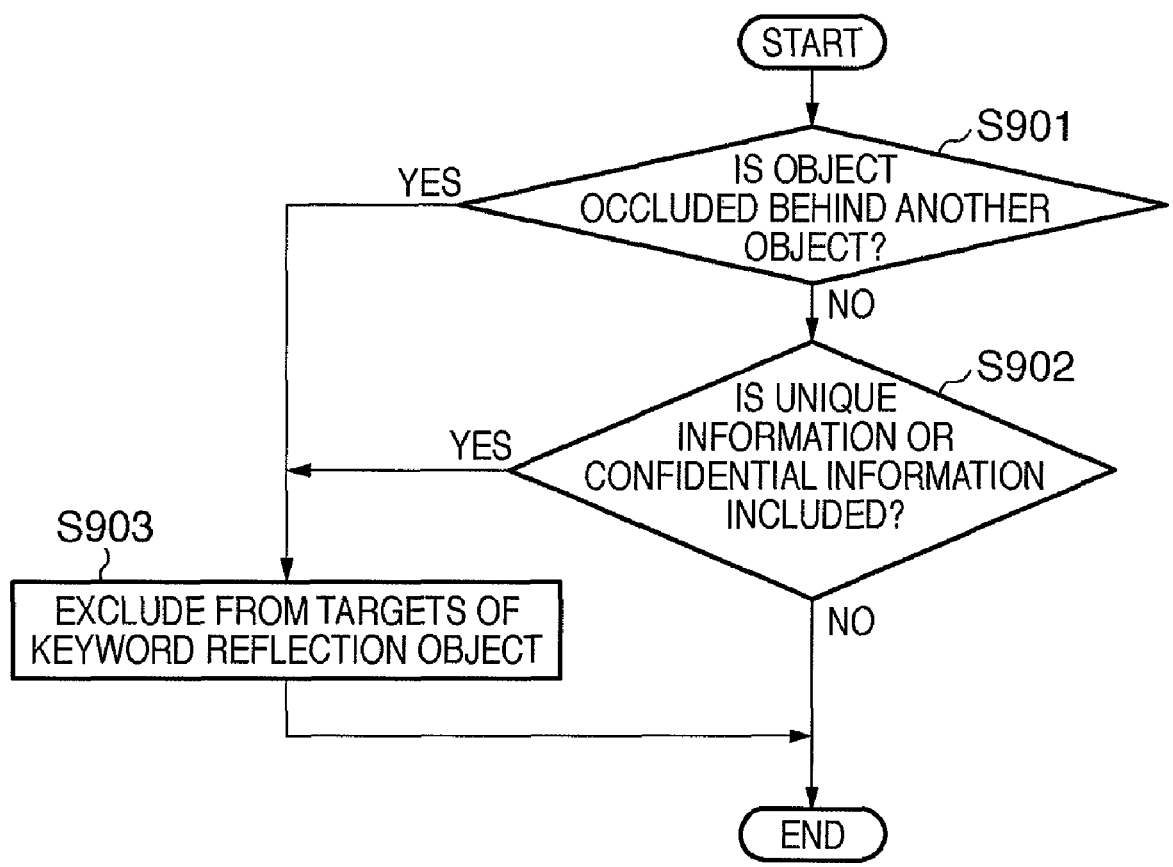
FIG. 9 is a flowchart showing the sequence of processing for discriminating metadata to which the edited contents are to be reflected according to the embodiment.

FIG. 9 is a flowchart showing the sequence of the process in step S807 of FIG. 8.

It is determined in step S901 whether or not an object of interest which is used to determine whether or not to reflect the user's edited contents is an object which is occluded under another object and is not displayed or printed. If it is determined that the object of interest is occluded under another object, the process advances to step S903, and it is determined not to reflect the user's edited contents to that object. When the object of interest is occluded under another overlaying object, that object practically does not influence the print result of the document, and even when a search is conducted using that information, accurate information is not always given to the user. That is, an object which is not printed is excluded.

Furthermore, it is determined in step S902 whether or not the metadata of the object of interest includes information unique to that object or confidential information. The information unique to the object is, for example, the date and time of creation of that object. The confidential information is a keyword, for example, when the user belongs to project A, and describes a keyword "PA" which represents that effect in metadata for search. When these pieces of information are changed by reflection from other objects, or are reflected to other objects, uniqueness and confidentiality are lost. Therefore, the user's edited contents are not reflected to an object including unique information or confidential information. If it is determined in step S902 that the object includes confidential information, the process advances to step S903, and it is determined not to reflect the user's edited contents to that object. The unique information or confidential information may be stored in a storage area of the RAM or the like as a table, and may be determined by referring to that table.

Since the user's edited contents are not reflected to an object determined in step S903, the processes are repeated from step S807 for other objects in the document of interest, as has been already described above.

Figure 10:
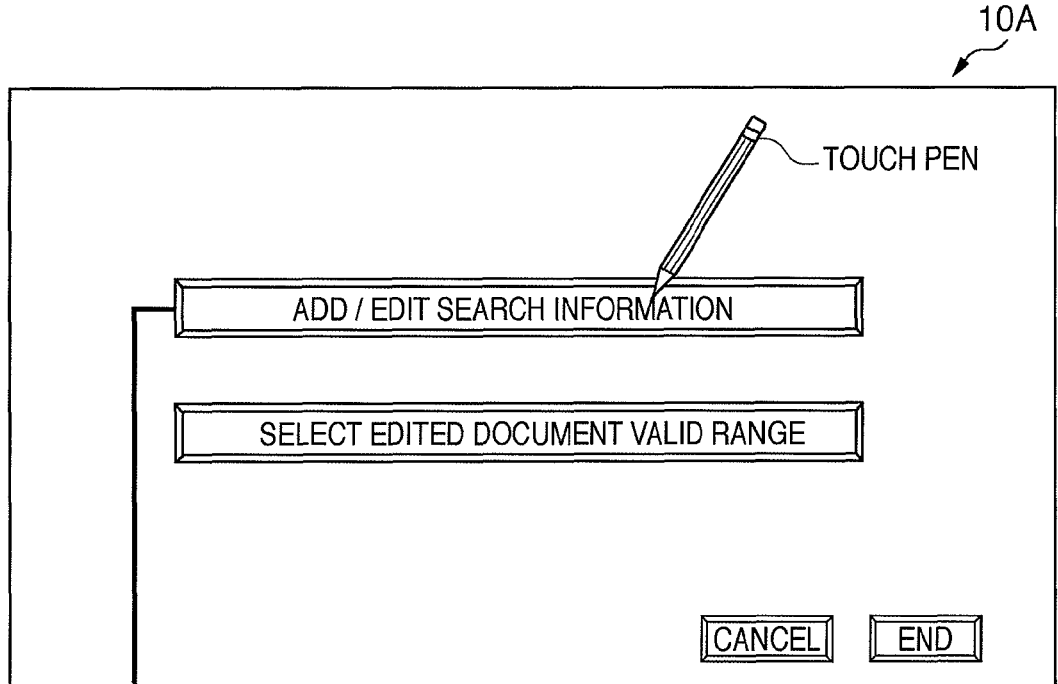
FIG. 10 is a view showing an example of a metadata editing user interface according to the embodiment.
Figure 11:
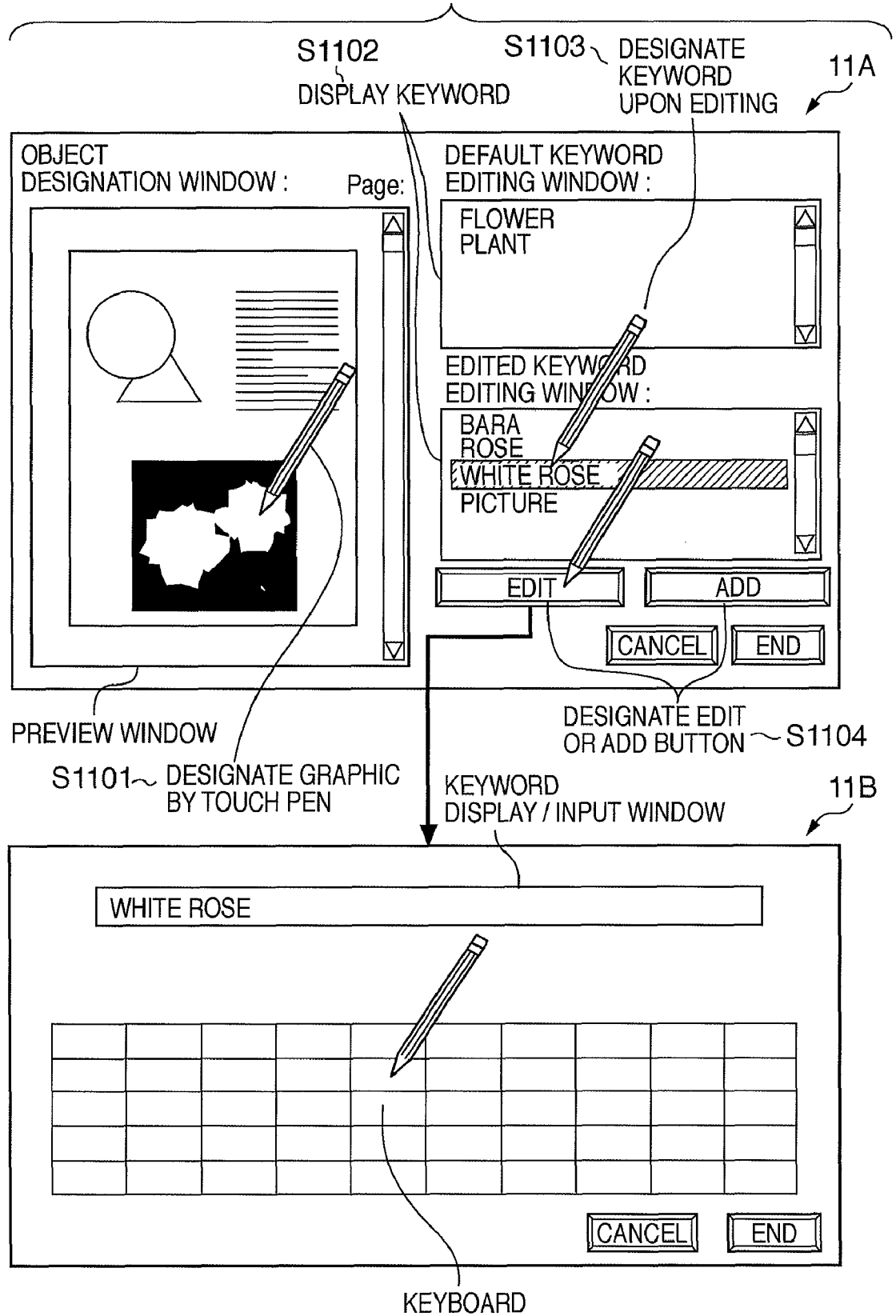
FIG. 11 is a view showing an example of a metadata editing user interface according to the embodiment.
Figure 12:
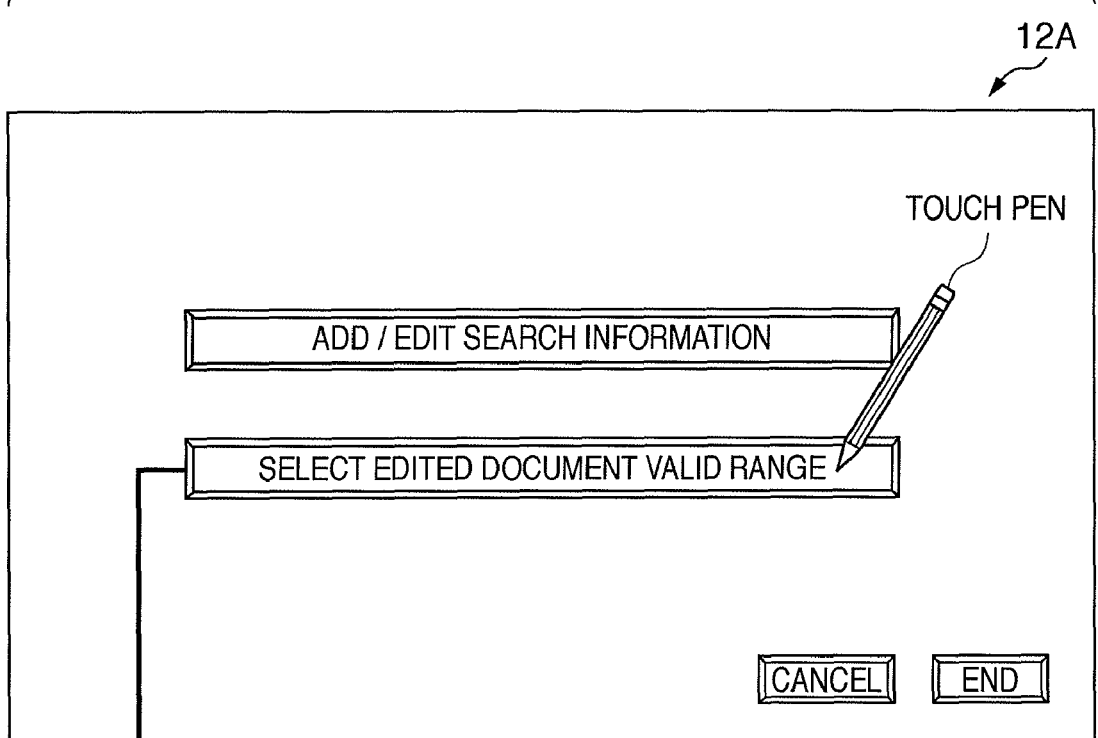
FIG. 12 is a view showing an example of a metadata editing user interface according to the embodiment.
Figure 12:
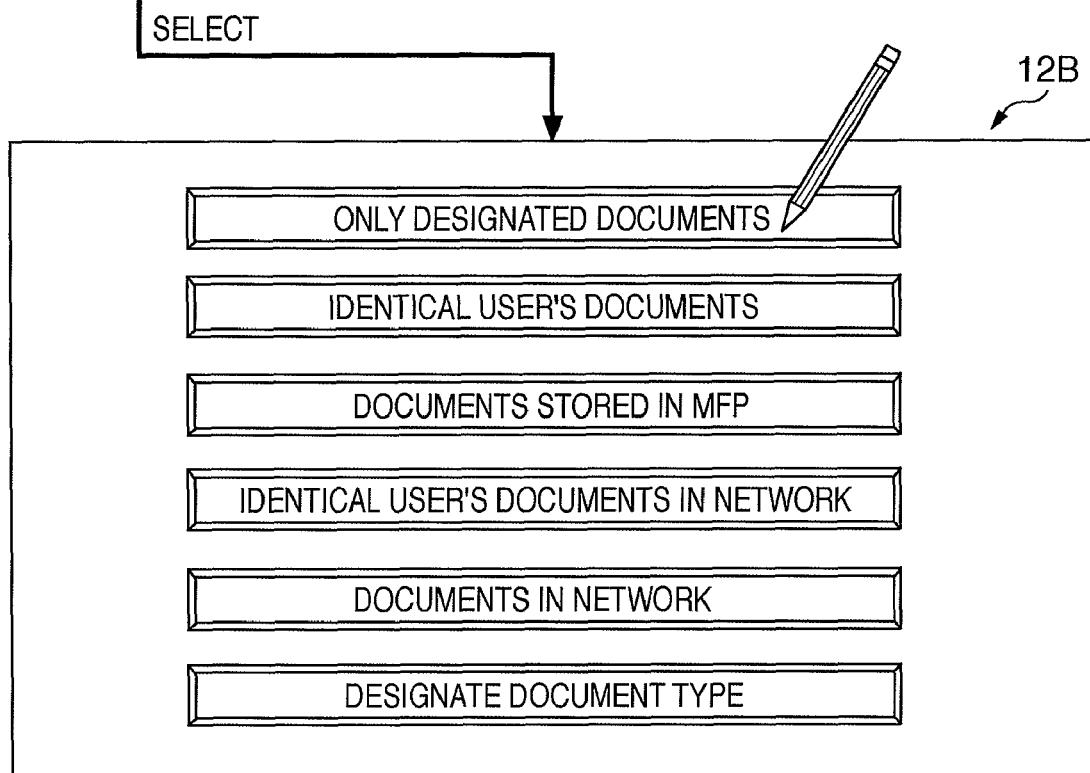

FIGS. 10, 11 and 12 are views showing an example of metadata editing user interfaces.

The user selects and presses an "add/edit search information" button shown in 10A of FIG. 10 when he or she edits information of metadata. Upon selection of this button, a screen shown in 10B of FIG. 10 is displayed. 10B of FIG. 10 shows a list of documents saved in a BOX. The user selects a document to be edited on the screen shown in 10B of FIG. 10. In this embodiment, the user selects a desired document to be edited on a touch panel using a touch pen.

After the document is selected, and the user presses a "select" button on the lower right position, a screen shown in 11A of FIG. 11 is displayed. As shown in 11A of FIG. 11, a preview of the document is displayed on the left side of the screen. When the user selects a drawing object on the screen using, for example, the touch pen (S1101), metadata information of the selected object is displayed on the right side of the screen. An upper right area on the screen displays keywords stored in the metadata, and a lower right area on the screen displays those which are to be edited (S1102). When the user wants to add an existing keyword, he or she presses an "add" button. When the user wants to further edit default keywords or keywords to be currently edited, he or she selects a default keyword or a keyword in those to be edited (S1103), and presses an "edit" button (S1104).

When either of these buttons is selected, a screen shown in 11B of FIG. 11 is displayed. Upon pressing of the "add" button, an upper area in 11B of FIG. 11 is blank, and displays a selected character string upon editing. A lower area in 11B of FIG. 11 serves as a keyword, which is used to type characters. When the user presses an "end" button after the add/edit operation, the editing processing ends.

The range of documents to which the user's edited contents are to be reflected is designated on a screen shown in 12B of FIG. 12 which is displayed upon pressing a "select edited document valid range" button shown in 12A of FIG. 12. In this embodiment, the user can designate the range from "only designated documents", "identical user's documents", "documents stored in MFP", "identical user's documents in network", and "documents in network".

As described above, according to this embodiment, when the user edits metadata of a certain document. stored in the image forming apparatus, the edited contents are reflected to objects of the same attribute having the same contents as the metadata in the image forming apparatus. As a result, in the image forming apparatus, information can be prevented from being biased due to the user's edit operation among objects having identical metadata.

Since all the edited contents are not reflected depending on the edited contents or conditions, the reflection processing of the edited contents significant to the user can be attained.

<Second Embodiment>

In the second embodiment, an image processing system in which MFPs shown in FIGS. 1 to 6 are connected via a network is used. This embodiment will explain the operation executed when an image captured by a scanner or PDL data, which is saved in a box, is transmitted to another MFP via a network, and is printed.

Figure 14:
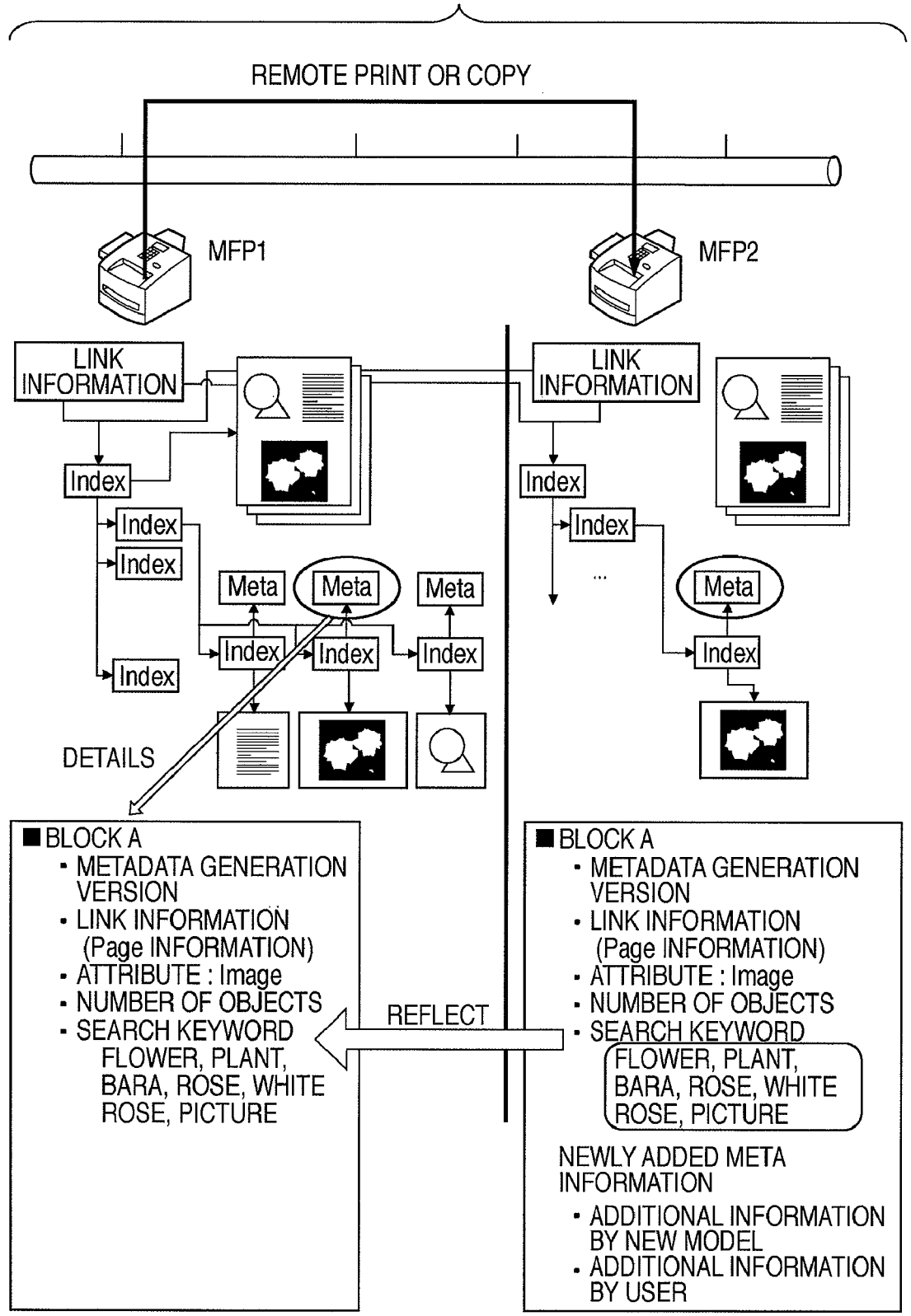
FIG. 14 is a view showing an overview of reflection processing of edited information of metadata in remote print processing and remote copy processing according to the second embodiment.

FIG. 14 is a view showing an overview when UDF data is transferred from an MFP 1 to an MFP 2, and the transferred UDF data is printed. The MFP 1 shown in FIG. 14 stores two keywords "flower" and "plant" in metadata of image data of roses as one of objects of the UDF data to be printed. When this UDF data is transferred to and printed by the MFP 2, for example, a metadata generation program automatically re-generates metadata in the MFP 2. In this case, vector data itself remains unchanged.

When the processes of metadata generation processors of the MFPs 1 and 2 are different (for example, programs for executing generation processing have different versions), the re-generated metadata may often be different from that in the received UDF data which is transferred from the MFP 1.

For example, when the MFP 2 is an upper model compared to the MFP 1, the metadata generation processor included in the MFP 2 is likely to generate metadata having a larger number of pieces of information than the metadata generation processor included in the MFP 1.

In this case, differences from the metadata of the MFP 1 as a transfer source are extracted, and are reflected to the metadata in the MFP 1, thus absorbing the differences between the metadata of the two MFPs. For example, as shown in FIG. 14, in the MFP 2 having a second generation unit (indicating the metadata generation processor in the MFP 2), keywords "bara", "rose", "white rose" and "picture" are added. In this case, this metadata information is sent to the MFP 1 having a first generation unit (indicating the metadata generation processor in the MFP 1), thereby updating the metadata included in the UDF data in the BOX. In this embodiment, only when the generation units for generating metadata are different, metadata is re-generated.

Figure 15:
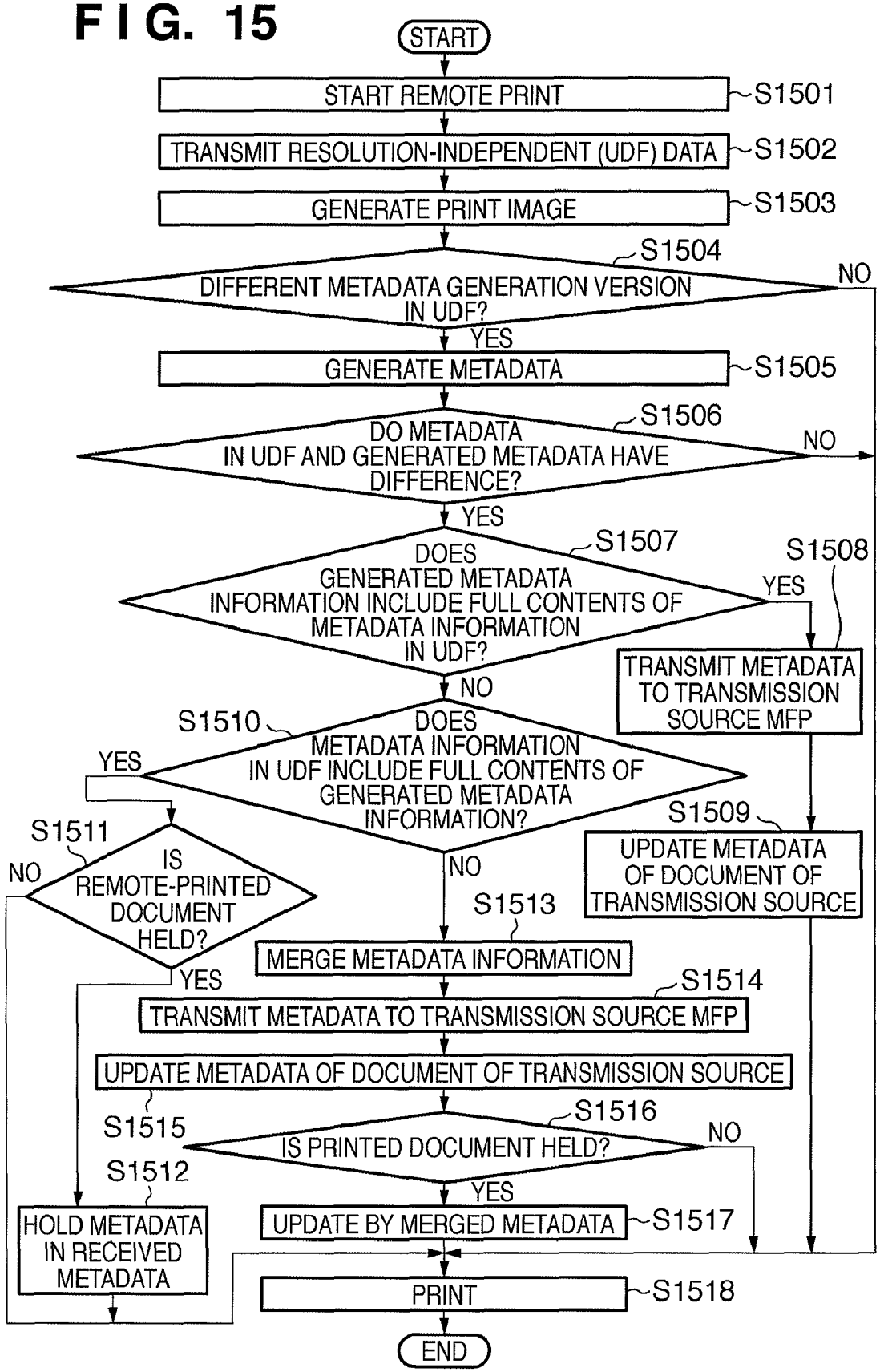
FIG. 15 is a flowchart showing the sequence of metadata generation processing and metadata information sharing processing in the remote print processing and remote copy processing according to the embodiment.

FIG. 15 is a flowchart showing the sequence of processing of the image processing apparatus according to this embodiment. FIG. 15 explains the operation of the controller board 201 in reflection processing of edited information upon editing of metadata. The processing of the flowchart shown in FIG. 15 is executed by, for example, the CPU 202.

In step S1501, remote print processing is started in response to, for example, a user's instruction. In step S1502, resolution-independent data (UDF data or the like) is transmitted from the MFP 1 to the MFP 2. In step S1503, the MFP 2 that received the resolution-independent data generates a print image from vector data. The reason why the print image is generated prior to metadata is that characters generated using lines and curves can be recognized as characters only after they are converted into images.

In step S1504, the metadata generation processor stored in the UDF data is compared with that of the MFP 2. For example, the version of a metadata generation program stored in the UDF data is compared with that of the MFP 2. If it is determined that the two processors are different, the process advances to step S1505 to generate metadata. On the other hand, if it is determined that the two processors are the same, the process jumps to step S1518. In this embodiment, it may be determined whether or not the version of firmware used to generate metadata recorded in the UDF data is older than that of firmware installed in the MFP 2. An example of generation determination (second determination) in this embodiment has been described.

It is determined in step S1506 whether or not the metadata generated in step S1505 and that in the UDF data have differences. If it is determined that the two metadata have differences, the process advances to step S1507 to determine whether or not keywords in the generated metadata include all keywords in the metadata in the UDF data. On the other hand, if it is determined that the two metadata have no difference, the process jumps to step S1518.

If it is determined in step S1507 that the keywords in the generated metadata (generated metadata) include all the keywords in the metadata (received metadata) in the UDF data, the process advances to step S1508. In this case, the generated metadata generated in the MFP 2 includes keywords, which are not included in the received metadata transmitted from the MFP 1. Therefore, in order to remove these differences, that is, those of the metadata, the metadata generated in the MFP 2 is transmitted to the MFP 1 as a transmission source in step S1508. Furthermore, the MFP 1 updates the metadata in itself by the received metadata in step S1509.

If it is determined in step S1507 that the keywords in the generated metadata do not include all the keywords in the metadata in the UDF data, the process advances to step S1510. It is determined in step S1510 whether or not the keywords of the metadata in the UDF data include all generated keywords. If it is determined that the keywords of the metadata in the UDF data include all keywords in the generated metadata, the process advances to step S1511 to determine whether or not the UDF data transmitted to the MFP 2 is held by the MFP 2. If it is determined that the UDF data is held by the MFP 2, the metadata in the received UDF data is held in step S1512. On the other hand, if it is determined that the UDF data is not held by the MFP 2, the process jumps to step S1518.

If it is determined in step S1510 that the keywords of the metadata in the UDF data do not include all generated keywords, in step S1513 the metadata in the UDF data is merged to that generated in step S1505. That is, this is the case when two metadata include only partially overlapping contents. In step S1514, the merged metadata is transmitted to the MFP 1.

In step S1515, the MFP 1 updates the metadata in itself by the metadata merged in step S1513. It is determined in step S1516 if a document to be printed is held in the MFP 2. If it is determined that the document is to be held, the process advances to step S1517. In step S1517, the metadata in the self apparatus is updated by the metadata merged in step S1513, and the updated metadata is stored. In step S1518, the print processing is executed using the print image generated in step S1503.

As described above, according to this embodiment, whether or not the metadata generation processor of metadata in a document received from another image forming apparatus is different from that of an image forming apparatus which executes print processing is determined. Only when it is determined that the two processors are different, the metadata in the received document is compared with metadata generated by the image forming apparatus which executes print processing, and the metadata are reflected to complement to each other. As a result, when the other image forming apparatus gives the instruction to execute remote print processing of a document, metadata differences caused by different metadata generation processors can be prevented.

<Third Embodiment>

In the third embodiment, a box as a document storage destination is configured by an external server, and is used as a common storage destination from respective MFPs included in an image processing system. This external server will be referred to as a Super BOX hereinafter.

Figure 16:
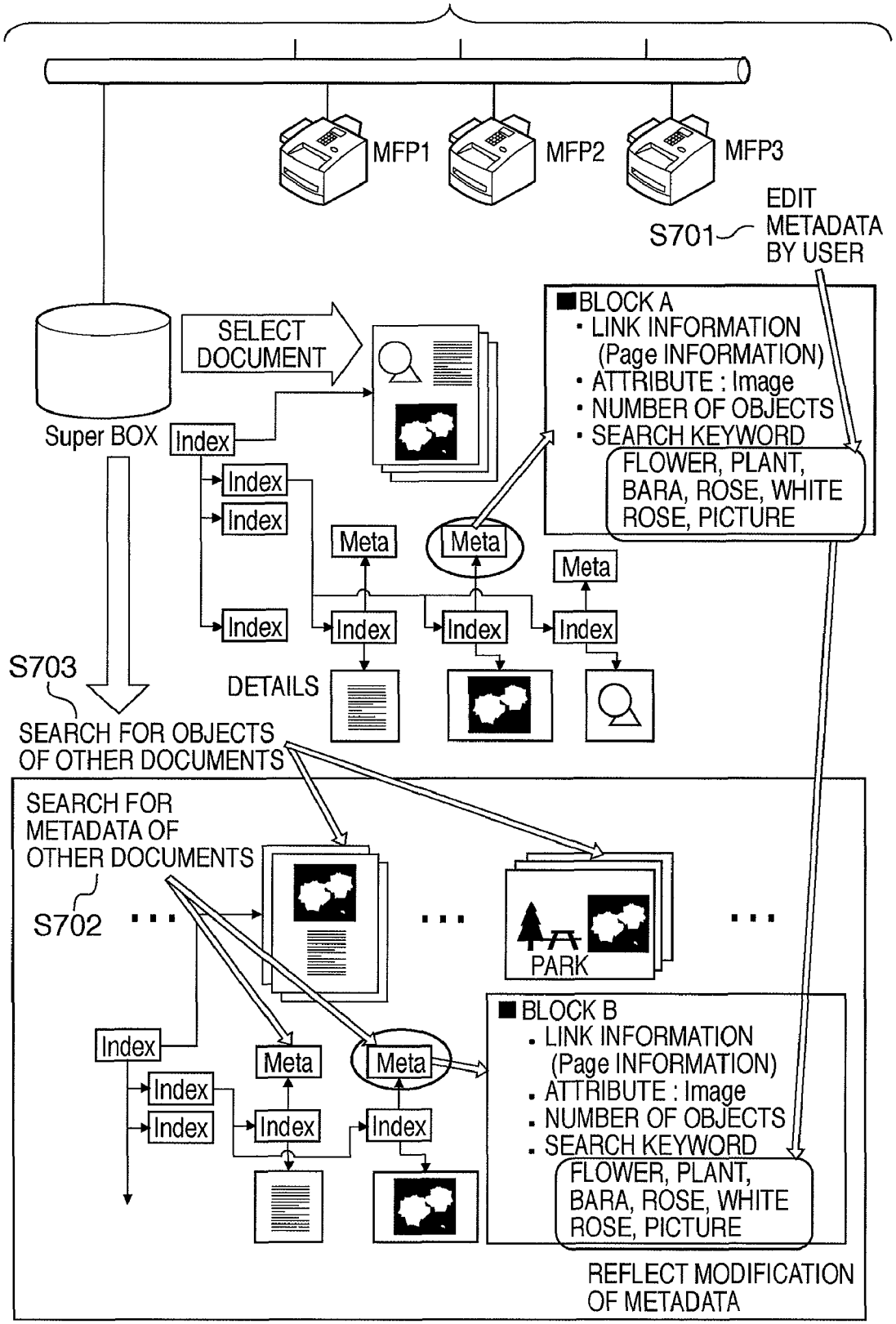
FIG. 16 is a view showing an overview of an information sharing operation of metadata according to the embodiment.

FIG. 16 is a view showing an overview of the operation of this embodiment. Respective MFPs are connected to the Super BOX via a network, and images scanned by these MFPs and PDL data are stored in the Super BOX. With this arrangement, both the processing shown in FIG. 8 in the first embodiment, and that shown in FIG. 15 described in the second embodiment can be implemented.

For example, when the user edits metadata in the Super BOX, and when the edited contents are to be reflected to metadata of identical objects in other documents in the Super BOX, the processing shown in FIG. 8 can be applied. On the other hand, when a document is stored in the Super BOX, metadata may be automatically generated. Furthermore, in this case, processing for automatically generating metadata in the Super BOX may often be different from that for generating metadata in other documents already stored in the Super BOX. In such case, the processing shown in FIG. 15 can be applied.

In the first embodiment, documents outside the self MFP are stored in other MFPs, and edit processing and difference reflection processing of metadata are executed in each MFP. In this embodiment, the MFP used to generate and edit metadata executes difference reflection processing even for documents stored in the Super BOX outside the self MFP.

When the MFP 1 generates or edits metadata appended to documents in the Super BOX, differences between metadata generated by the MFP 1 and that generated by another MFP are extracted. The extracted differences are reflected to metadata in documents in the Super BOX, thereby absorbing differences among metadata appended to documents in the Super BOX. As shown in FIG. 16, keywords "bara", "rose", "white rose" and "picture" are added by the user's edit operation. In this case, other documents in the Super BOX are searched, and the added keywords are reflected to metadata of other objects having identical metadata.

Figure 17:
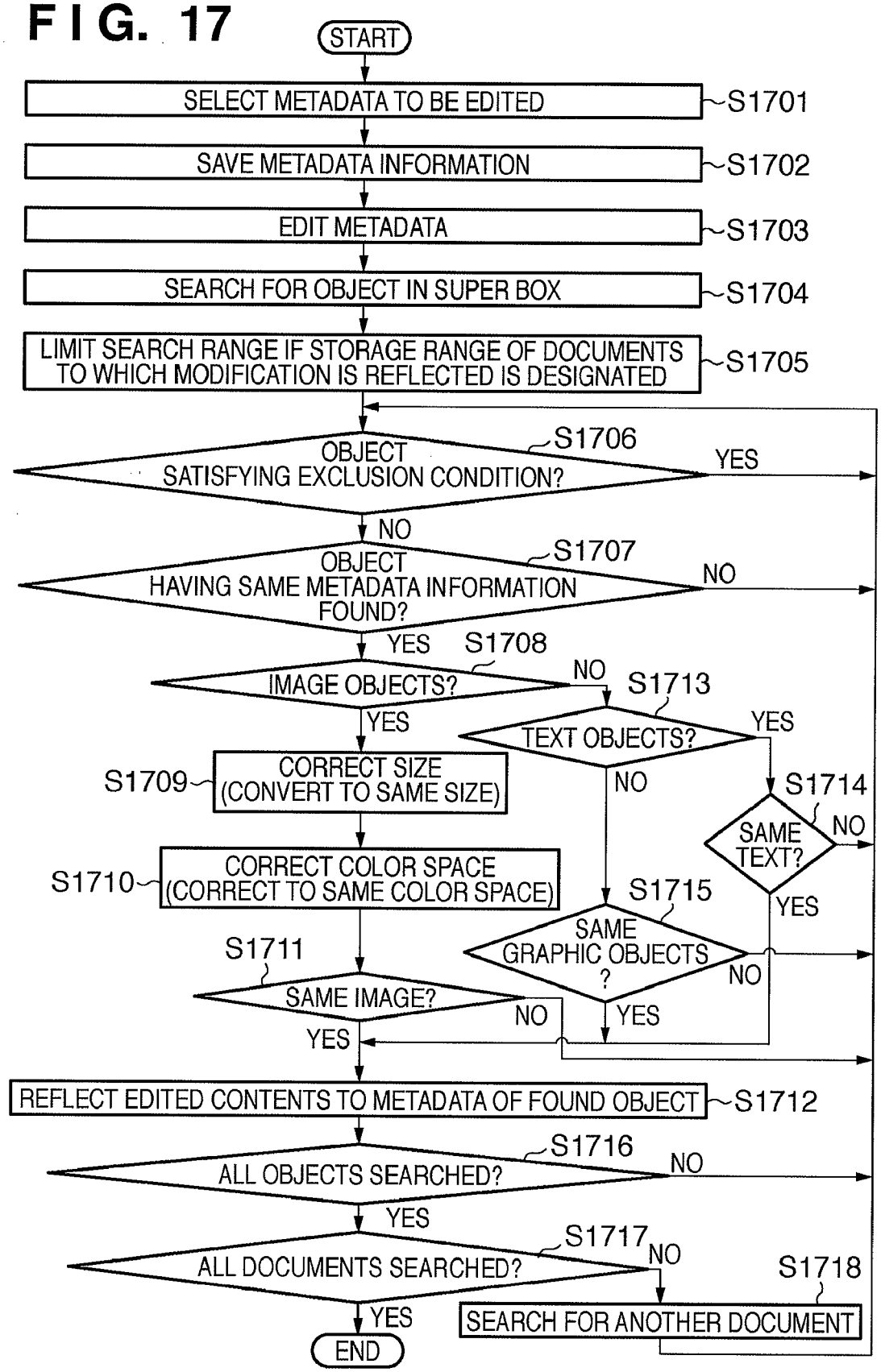
FIG. 17 is a flowchart showing the sequence of processing when the processing shown in FIG. 8 is applied to the embodiment.

FIG. 17 is a flowchart showing the sequence of processing executed when the processing of FIG. 8 is applied to this embodiment. FIG. 17 explains the operation of the controller board 201 in reflection processing of edited information upon editing metadata. The processing of the flowchart shown in FIG. 17 is executed by, for example, the CPU 202.

In step S1701, the user selects metadata to be edited. In step S1702, the metadata before editing is held. In step S1703, the user selects an object and edits metadata.

In step S1704, a search for documents which are stored in the Super BOX and have the same objects as that selected by the user is started. If the user designates the type of document, the range of documents to be selected as search targets is limited in step S1705. The user can designate the document type on the UI shown in FIG. 13B which is displayed by selecting "designate document type" in 12B of FIG. 12. In this embodiment, the user can select the type from "PDF", "Word", "TEXT", "JPEG", and "EXCEL". If the user selects "ALL", all files are selected as search targets. In this case, a designated document storage location in the Super BOX may be designated as a search range.

It is determined in step S1706 whether or not each object in a desired document or a document of interest within the search range is an object which satisfies a predetermined condition. If it is determined that the object is an object which satisfies the predetermined condition, the reflection processing of the user's edited contents is skipped, and the processes are repeated from step S1706 for other objects in the document of interest. On the other hand, if it is determined that the object is not an object which satisfies the predetermined condition, the process advances to step S1707. Note that the process in step S1706 is the same as that described using FIG. 9.

It is determined in step S1707 whether or not the object of interest has the same metadata as that before editing. If it is determined that the object of interest does not have the same metadata, the reflection processing of the user's edited contents is skipped, and the processes are repeated from step S1706 for other objects in the document of interest. On the other hand, if it is determined that the object of interest has the same metadata, the process advances to step S1708 to determine whether or not that object is an image object. The processes in steps S1708 to S1718 respectively correspond to steps S809 to S819 in FIG. 8, and the same description as in FIG. 8 applies to these processes.

Figure 18:
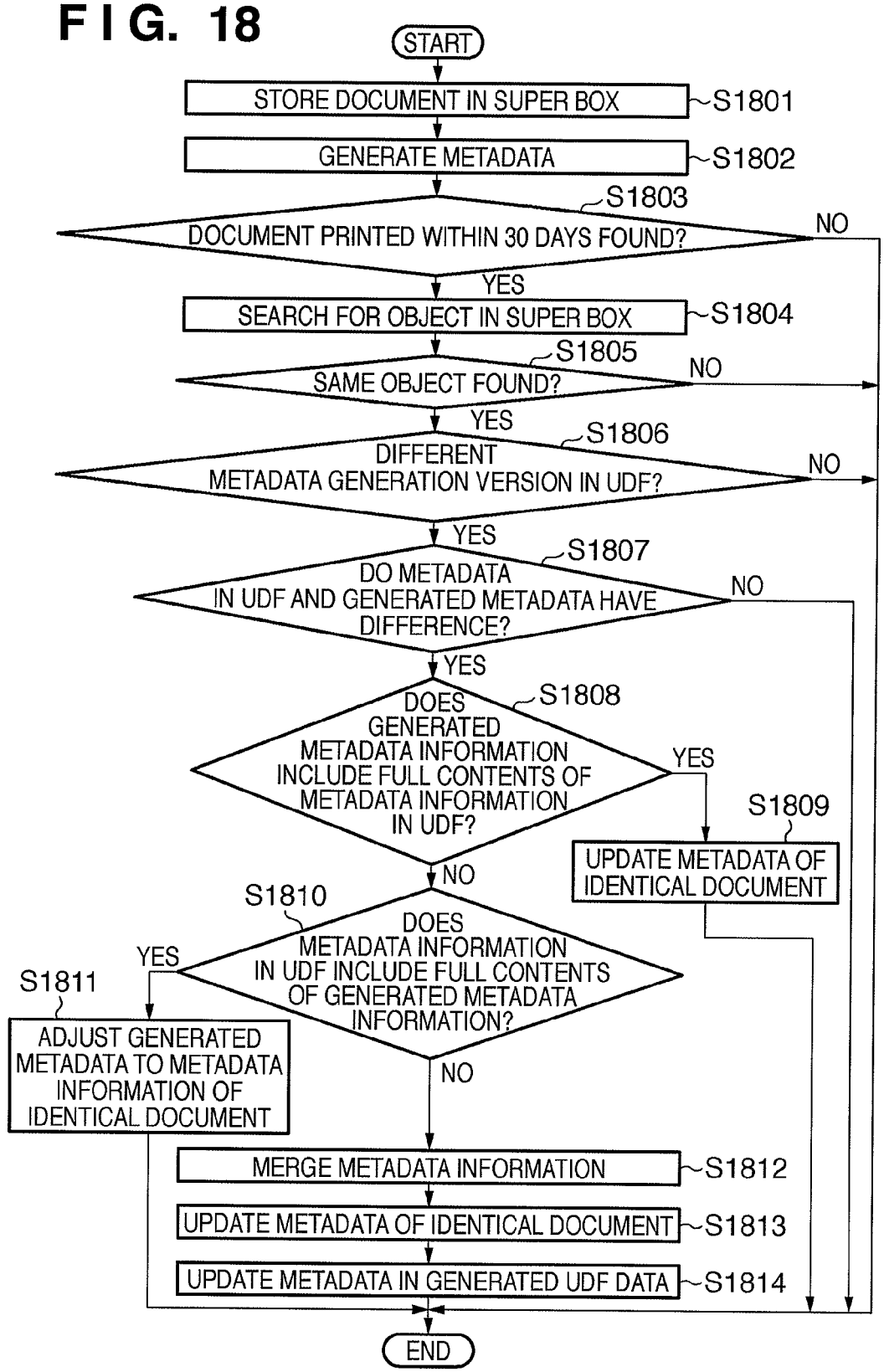
FIG. 18 is a flowchart showing the sequence of processing when the processing shown in FIG. 15 is applied to the embodiment.

FIG. 18 is a flowchart showing the sequence of processing executed when the processing in FIG. 15 is applied to this embodiment. FIG. 18 explains the operation of the controller board 201 in reflection processing of edited information upon editing metadata. The processing of the flowchart shown in FIG. 18 is executed by, for example, the CPU 202.

When the MFP 1 stores a document in the Super BOX in step S1801, metadata is automatically generated in step S1802. It is determined in step S1803 whether or not the Super BOX stores files which were printed within the range of the predetermined number of days (for example, within 30 days). If it is determined that the Super BOX stores documents which were printed within 30 days, the process advances to step S1804, and an object search is started in these documents in the Super BOX. On the other hand, if it is determined that the Super BOX does not store any document printed within 30 days, the reflection processing is skipped, and this processing ends.

It is then determined in step S1805 whether or not these documents include the same object as that of the metadata (image objects, text objects, or graphic objects).

If it is determined in step S1805 that the documents do not include the same object, the reflection processing is skipped, and this processing ends. On the other hand, if it is determined that the documents include the same object, the process advances to step S1806.

In step S1806, the metadata generation processor of a document which is stored in the Super BOX and has the same object is compared with that of the metadata generated in step S1802. If the metadata generation processors are different, the process advances to step S1807. On the other hand, if the metadata generation processors are not different, the reflection processing is skipped, and this processing ends. Note that the metadata generation processor of the document which is stored in the Super BOX and has the same object may be checked by referring to, for example, UDF data of that document.

It is determined in step S1807 whether or not the generated metadata and the metadata of the document which is stored in the Super BOX and has the same object have differences. If it is determined that these metadata have differences, the process advances to step S1808 to determine whether or not keywords in the generated metadata include all keywords in the metadata of the same object stored in the Super BOX. On the other hand, if it is determined that the two metadata have no difference, the reflection processing is skipped, and this processing ends.

If it is determined in step S1808 for the object of interest that the keywords in the metadata generated by the MFP 1 include all keywords of the same object stored in the Super BOX, the process advances to step S1809. In step S1809, the metadata of the same object stored in the Super BOX is updated.

On the other hand, if it is determined that the keywords in the metadata generated by the MFP 1 do not include all keywords in the metadata of the same object stored in the Super BOX, the process advances to step S1810. It is determined in step S1810 whether or not keywords of the metadata appended to the same object stored in the Super BOX include all keywords in the generated metadata.

If it is determined that the keywords of the metadata appended to the same object stored in the Super BOX include all keywords in the generated metadata, the process advances to step S1811. In step S1811, the generated metadata is stored in place of that of the same object stored in the Super BOX. On the other hand, if it is determined that the keywords of the metadata appended to the same object stored in the Super BOX do not include all keywords in the generated metadata, the process advances to step S1812. In step S1812, the metadata of the same object stored in the Super BOX is merged to the generated metadata.

In step S1813, the merged metadata is reflected to the generated metadata. Furthermore, in step S1814 the metadata of the same object stored in the Super BOX is updated by information of the merged metadata.

As described above, according to this embodiment, even to documents stored in a storage location which is located outside the self apparatus and is connected via the network, the MFP used to generate or edit metadata can execute difference reflection processing.

The present invention can also be implemented as an information processing program as follows. The present invention also includes a case in which an operating system (OS) or the like, which runs on a computer, executes some or all of actual processes based on an instruction of a program code, and the functions of the aforementioned embodiments are implemented by these processes. Furthermore, the present invention is also applied to a case in which a program code read out from a storage medium is written in a memory equipped on a function expansion card or unit which is inserted in or connected to a computer. In this case, a CPU or the like equipped on the function expansion card or unit executes some or all of actual processes based on an instruction of the written program code, and the functions of the aforementioned embodiments are implemented by these processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166543, filed Jun. 25, 2008, which is hereby incorporated by reference herein in its entirety.

What is claimed is:

1. An information processing apparatus comprising:
a generation unit configured to generate metadata to be appended to an object in a document, the metadata being used as additional information;
a search unit configured to search for second metadata appended to a second object in a second document based on first metadata appended to a first object in a first document which is different from the second document, in a case where the first and second metadata are generated by said generation unit and are respectively appended to the first and second object, a content of the searched second metadata being the same as a content of the first metadata;
an edition unit configured to edit the content of the first metadata; and
a reflection unit configured to reflect the edited content of the first metadata edited by said edition unit to the content of the second metadata,
wherein at least one processor executes process steps stored in a memory to function as at least one of the units.

2. The apparatus according to claim 1, wherein the generation unit generates the metadata based on a result of analyzing image data corresponding to the document.

3. The apparatus according to claim 1, wherein the reflection unit excludes the second metadata from a reflection target, in a case where the second object is occluded under another overlaying object in the second document.

4. The apparatus according to claim 1, wherein the reflection unit excludes the second metadata from a reflection target, in a case where the content of the second metadata includes one of confidential information and information unique to the second object.

5. The apparatus according to claim 1, wherein the search unit searches for the second metadata among documents stored in a document storage location designated by a user.

6. The apparatus according to claim 1, wherein the search unit searches for the second metadata among documents in a type designated by a user.

7. The apparatus according to claim 1, further comprising a determination unit configured to determine whether or not to reflect the edited content of the first metadata edited by said edition unit to the content of the second metadata,
wherein in a case where the determination unit determines not to reflect the edited content, reflection processing of the reflection unit is skipped.

8. The apparatus according to claim 7, wherein the determination unit determines whether or not to reflect the edited content of the first metadata edited by said edition unit to the content of the second metadata with reference to a list of keywords which are prohibited to be reflected, the list being stored in a storage area.

9. An information processing method comprising:
a generation step of generating metadata to be appended to an object in a document, the metadata being used as additional information;
a search step of searching for second metadata appended to a second object in a second document based on first metadata appended to a first object in a first document which is different from the second document, in a case where the first and second metadata are generated in said generation step and are respectively appended to the first and second object, a content of the searched second metadata being the same as a content of the first metadata;
an edition step of editing the content of the first metadata; and
a reflection step of reflecting the edited content of the first metadata edited in said edition step to the content of the second metadata.

10. A non-transitory computer-readable storage medium retrievably storing a program for causing a computer to function to:
generate metadata to be appended to an object in a document, the metadata being used as additional information;
search for second metadata appended to a second object in a second document based on first metadata appended to a first object in a first document which is different from the second document, in a case where the first and second metadata are generated and are respectively appended to the first and second object, a content of the searched second metadata being the same as a content of the first metadata;
edit the content of the first metadata; and
reflect the edited content of the first metadata to the content of the second metadata.

11. An information processing apparatus comprising:
a reception unit configured to receive a document including first metadata appended to an object in the document and information indicating a first generation unit used to generate the first metadata from an apparatus connected via a network;
a second generation unit configured to generate second metadata to be appended to the object in the document received by said reception unit;
a determination unit configured to determine whether or not the second generation unit is different from the first generation unit;
a comparison unit configured to compare, in a case where the determination unit determines that the first generation unit is different from the second generation unit, a content of the first metadata with a content of the second metadata; and
a reflection unit configured to, (i) in a case where the content of the first metadata includes all of the content of the second metadata, reflect the content of the first metadata to the content of the second metadata, (ii) in a case where the content of the second metadata includes all of the content of the first metadata, reflect the content of the second metadata to the content of the first metadata, and (iii) in a case where the content of the first metadata are partially overlapped to the content of the second metadata, merge the content of the first metadata and the content of the second metadata and reflect the merged content to the content of the second metadata,
wherein at least one processor executes process steps stored in a memory to function as at least one of the units.

12. The apparatus according to claim 11, further comprising a search unit configured to search for another document including the same object as the object to which the second metadata generated by the second generation unit is appended.

13. The apparatus according to claim 12, wherein the search unit searches for documents which have been printed within a range of a predetermined number of days.

* * * * *